MARION E. HINES, INVENTOR
BY: ALFRED H. ROSEN, ATTORNEY

MARION E. HINES, INVENTOR

BY: ALFRED H. ROSEN, ATTORNEY

MARION E. HINES, INVENTOR
BY: ALFRED H. ROSEN, ATTORNEY

MARION E. HINES, INVENTOR
BY: ALFRED H. ROSEN, ATTORNEY

MARION E. HINES, INVENTOR
BY: ALFRED H. ROSEN, ATTORNEY

MARION E. HINES, INVENTOR

BY: ALFRED H. ROSEN, ATTORNEY

MARION E. HINES, INVENTOR
BY: ALFRED H. ROSEN, ATTORNEY

MARION E. HINES, INVENTOR
BY: ALFRED H. ROSEN, ATTORNEY 3,491,310
Patented Jan. 20, 1970

3,491,310

MICROWAVE GENERATOR CIRCUITS COMBINING A PLURALITY OF NEGATIVE RESISTANCE DEVICES

Marion E. Hines, Weston, Mass., assignor to Microwave Associates, Inc., Burlington, Mass., a corporation of Massachusetts Filed Feb. 12, 1968, Ser. No. 704,817
Int. Cl. H03b 7/12
U.S. Cl. 331—96 28 Claims

ABSTRACT OF THE DISCLOSURE

Described are circuits and microwave structures for combining a multiplicity of elementary discharge devices (e.g.: Semiconductor diodes) biased for negative resistance at frequencies in a given band to obtain increased high frequency power and high frequency bandwidth of useful operation in that band. The basic principle involved is to prevent or suppress oscillations in undesired modes of resonance or propagation induced by the use of one or more diodes, by segregating these undesired modes into frequency bands outside the frequency range to be utilized.

Under this principle complex networks containing a large number of resonant loops and having as many resonant or normal modes as there are resonant loops are coupled into a primary resonator loop so that the network may oscillate or amplify in the desired mode and each diode contributes an equal share to the total power of the network, but the negative conductance properties of the diodes are substantially ineffective at frequencies other than the desired modes.

BACKGROUND OF THE INVENTION

The field of this invention is microwave generation and amplification of high power utilizing in combination a multiplicity of elementary devices which may be treated as two-terminal impedance elements which exhibit negative-resistance properties and are capable of individually generating high frequency oscillations over particular ranges of frequencies when suitably biased by a battery or other source of power.

One suitable element is the Read avalanche diode or other P–N junction diode biased into reverse avalanche discharge. This is a semiconductor P–N junction device first described by Read.[1] Alternative forms have been described by De Loach et al.[2] Another suitable semiconductor device is the Gunn diode [3] which consists of a wafer of gallium arsenide biased with a DC source. Gallium arsenide devices operating in the "LSA" mode are also suitable, as described by Copeland.[4] Transistor type structures may also be used if these can be arranged in an elementary form which provides a negative-resistance at high frequency at two terminals. Still other forms might includes PNPN type semiconductor diodes, high vacuum electron tubes, tunnel diodes, and the like. This invention is not primarily concerned with the internal structure of

[1] W. T. Read, "A Proposed High Frequency Negative-Resistance Diode," Bell Systems Tech. Journal, pp. 401–466, March 1968.

[2] R. L. Johnston, B. C. DeLoach, Jr., B. G. Cohen, "A Silicon Diode Microwave Oscillator," Bell Systems Tech. Journal, pp. 316–372, February 1965.

[3] J. B. Gunn, "Microwave Oscillations of Current in III–V Semiconductors," Solid State Comm., vol. 1, pp. 87–91, September 1963.

[4] J. A. Copeland, "L.S.A. Oscillator Diode Theory," Journal of Applied Physics, pp. 3096–3101, July 1967.

these elementary devices but rather with the circuits and structures in which they are placed. The invention applies to the application of any type of such oscillating or negative-resistance electron discharge device, including those not mentioned above or new types which are yet to be discovered.

Previous techniques for combining multiple individual elements include several basic approches. There is for example the technique of placing several small elements close together in a shunt or parallel combination across a high voltage gap in a single resonator or cavity. Parallel operation in this way is limited to relatively few elements in a given resonator because they must be very closely spaced and the impedance level decreases in inverse proportion to the number used. Very low impedances cause high resistive losses in the resonator and present severe problems in coupling. A corollary approach has been to place several elements in a series stack in a single resonator. The series combination, however, presents serious problems in extracting the heat generated by the elements in the center of the stack. Heat must flow outward through the others, severely limiting the total power dissipation.

Another prior technique involves the use of many single microwave resonators with separated input and/or output transmission lines. Fukui [5] has described such a technique for combining multiple separate oscillator circuits through the use of hybrid transmission line power combiners. When many elements are to be combined, the complexity and cost of such techniques becomes prohibitive.

The techniques for combining-negative resistance diodes were described by Hines in U.S. Patents No. 3,051,-908 and No. 3,231,831. The first of these, while providing for broadband amplification, is limited in output power capability because the technique used to couple the transmission line and the diode elements requires that each element be activated by the full line voltage. The present invention, on the other hand, provides a substantial improvement over the prior approaches in that very large numbers of electron-discharge elements can be used in a single structure to provide high power operation equivalent to the sum of the power available from each element.

A basic problem in combining many active negative-resistance elements for high power oscillation or amplification in a given frequency band is that of "moding," in which spurious or undesired modes of oscillation will occur at frequencies different from those in the desired band. At high frequencies, complex networks containing many electrical impedance elements generally have many "normal modes" of possible transient oscillation. When negative-resistance elements are included in such a network, continuous or erratic oscillations can occur in such modes if their resonant frequencies lie in a frequency range where the negative-resistance of the elements is effective. Such oscillations are called "spurious modes" when they involve undesired frequencies or internal electrical field patterns differing from the ones desired. The presence of spurious modes of oscillation will diminish the usefulness of a circuit or system for most applications.

It is a feature of this invention that spurious modes may be eliminated by appropriate network design criteria to be described.

In the accompanying drawings FIGURE 1 shows a

[5] H. Fukui, "A Multiple Silicon-Avalanche Diode Oscillator," International Electron Devices Meeting, October 26–28, 1966, Digest of Papers, p. 52.

qualitatively-sketched graph illustrating the behavior of the conductance of some types of negative-resistance semiconductor device elements. This graph shows the type of variation with frequency to be expected. All of the devices are presumed to show negative conductance (or resistance) in a band including the frequency $f_o$ desired. All of the devices also show this negative conductance to be decreasing in magnitude and becoming positive at high frequencies (e.g.: $f_s$) far above the desired band. Some devices also show reduced or vanishing negative conductance effects at lower frequencies, well separated from the band in which the device is intended to be used.

In order to avoid spurious oscillations, the new networks described herein are designed so that all of the normal resonant modes except the one desired occur at higher or lower bands of frequency than the desired operating frequency band. Thus, if the spurious modes have frequencies in the general vicinity of $f_s$ or higher, no oscillations can occur in such modes because the active elements have only positive or very small negative conductance at such frequencies. It is thus also possible to avoid oscillation at frequencies where there is a small residual negative conductance near the cross-over such as $f'_s$ on FIGURE 1, because circuit losses can be sufficient to prevent oscillation in such marginal cases.

It has also been found that the presence of strong oscillations at one frequency can cause the suppression of undesired modes of oscillation which might occur at other frequencies in other modes, even if the devices exhibit strong negative resistance effects at these other frequencies when not oscillating strongly. All negative resistance devices are nonlinear such that when strongly oscillating at one frequency, the alternating voltage periodically drives the device into positive-resistance portions of its current-voltage characteristic curve. In fact, when a negative resistance device is driven by a strong alternating voltage of such a magnitude as to extract the maximum useful power at the driving frequency, it is found that the time-average value of its negative conductance has vanished. With slightly higher alternating voltage applied the time-average conductance is positive. Under such conditions, oscillations at other frequencies may see no effective negative resistance and cannot start.

Thus, it is not always necessary to remove the other resonant modes into frequency bands where no negative resistance is found. Substantial frequency separation between the desired and undesired modes is necessary, however, for this method of suppression to be effective. Mode suppression by strong signals is a most effective technique for high power amplifiers where an input signal insures that oscillation occurs at the proper frequency in the proper mode.

SUMMARY OF THE INVENTION

This invention relates in general to microwave generators and amplifiers of power and in particular to circuits and mounting structures for employing a plurality of electron discharge elements to generate or amplify microwave energy. A fundamental object of this invention is to provide useful circuits and mounting structures for multiple elements of the electron discharge type so that they will act in unison to provide a single high frequency signal either coherently in a combined oscillation, or in synchronism under RF drive to provide a faithfully amplified replica of an input signal, and with a power output capability equivalent to the sum of the output capabilities of the many electron discharge elements used.

Another object of the invention is to provide a mounting structure for a plurality of electron discharge elements which can conduct away the excess heat energy produced by a multiplicity of elementary devices.

Still another object is to provide an electrical circuit for the multiple devices which allows a wider tuning range in the case of an oscillator, or increased frequency bandwidth in the case of an amplifier, than may be obtained with prior techniques.

DESCRIPTION OF THE INVENTION

Exemplary embodiments of the invention, and methods to make them, are described with reference to the accompanying drawings, in which.

Figure 3:
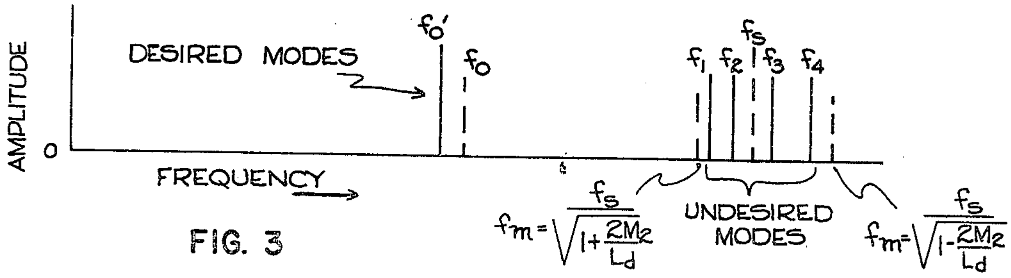
Figure 4:
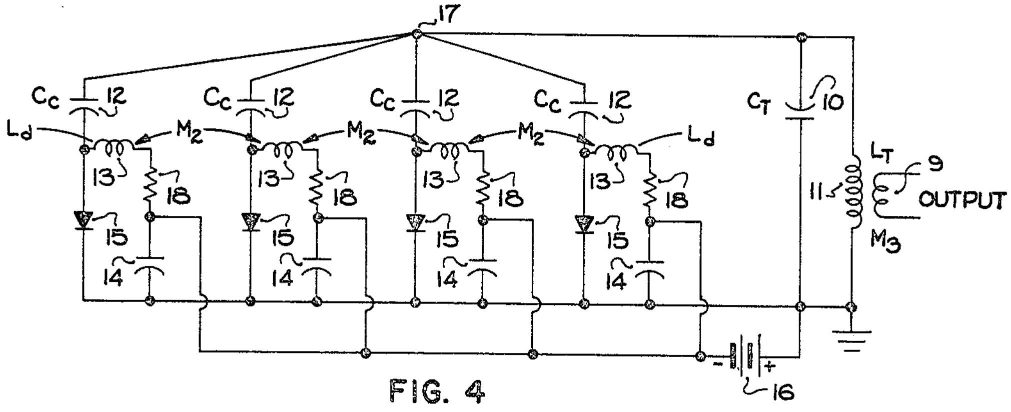
Figure 5:
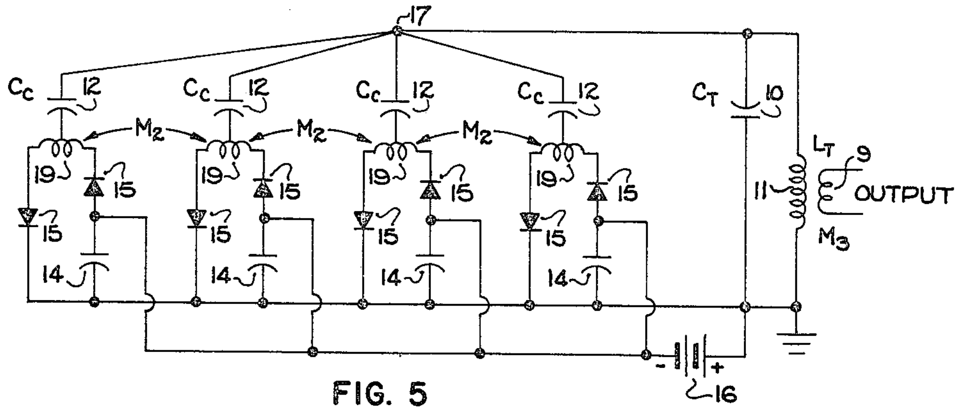
Figure 6:
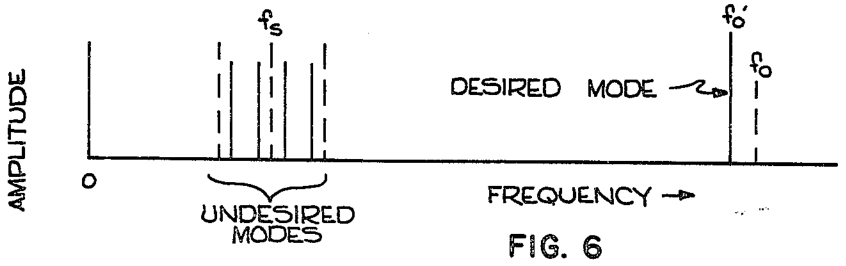
Figure 7:
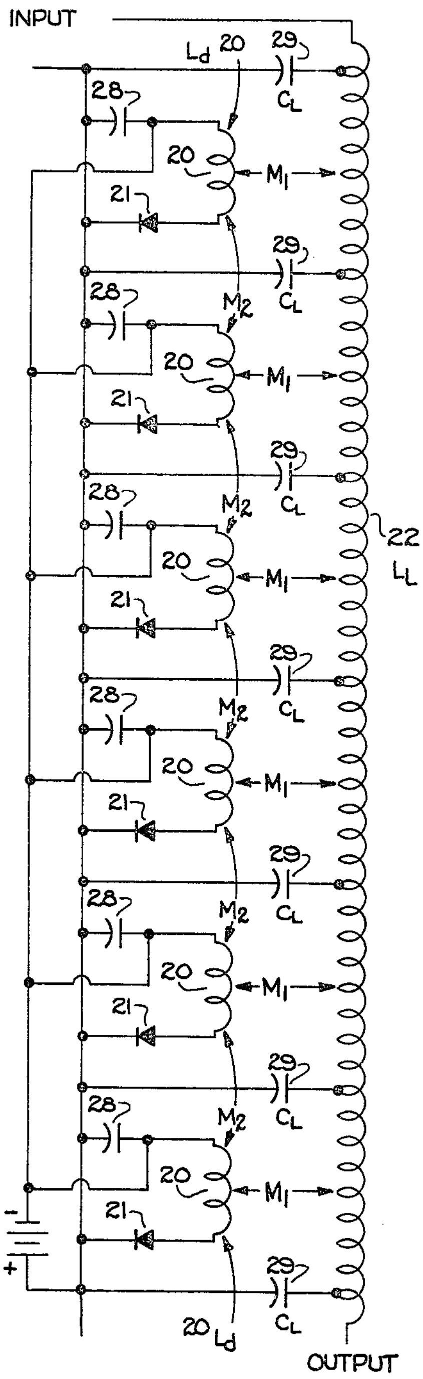
Figure 8:
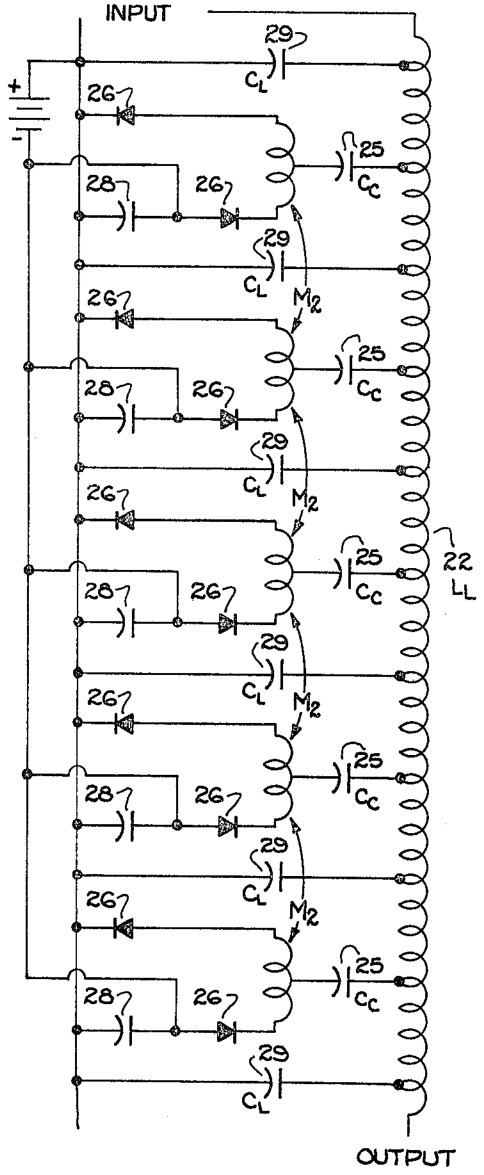
Figure 9:
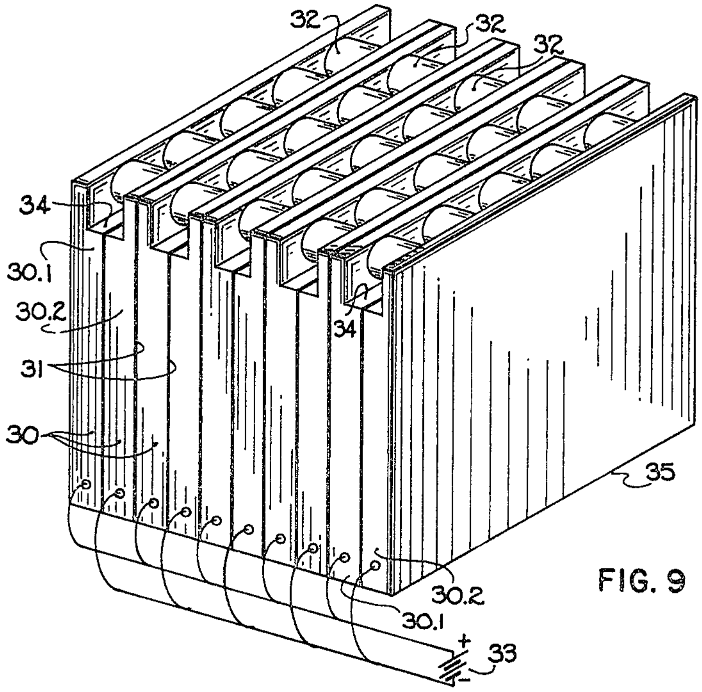
Figure 10:
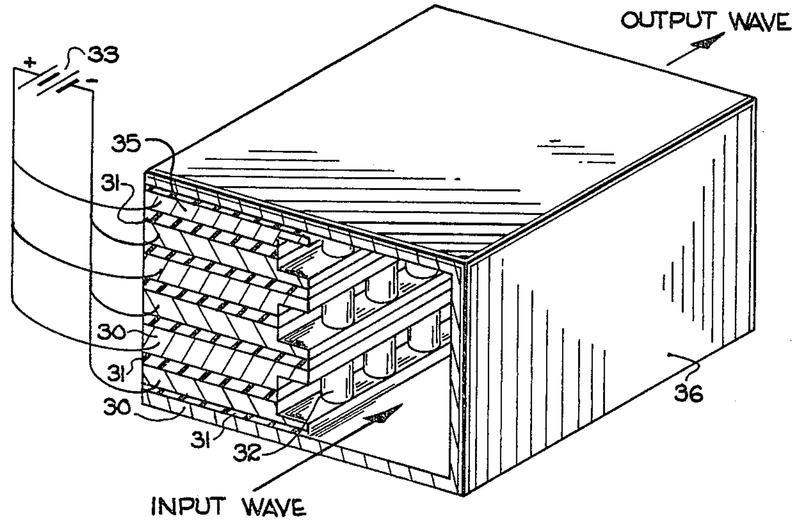
Figure 11:
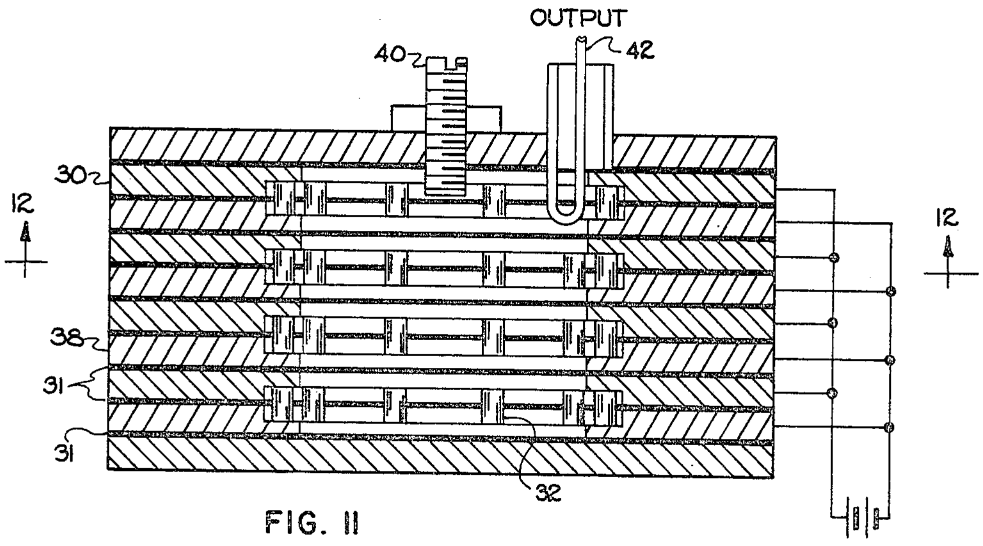
Figure 12:
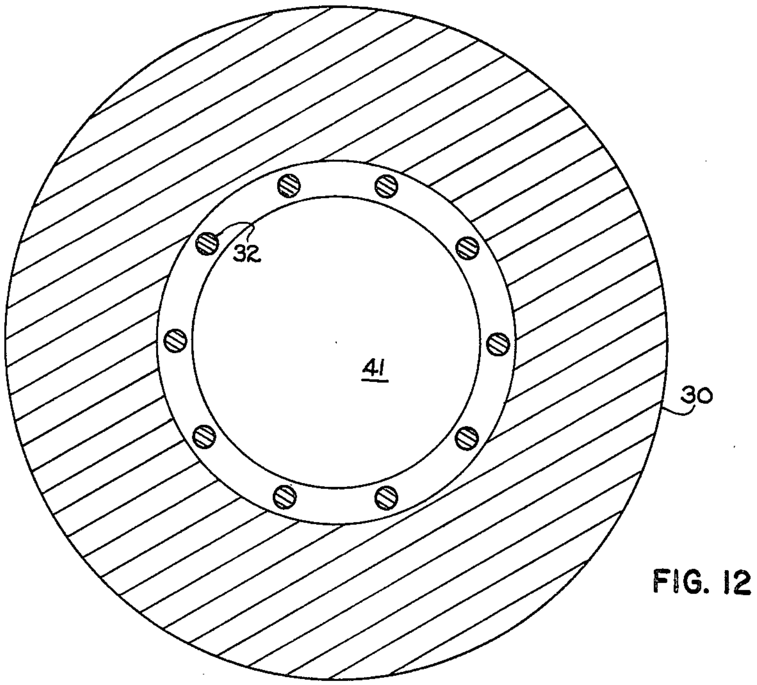
Figure 13:
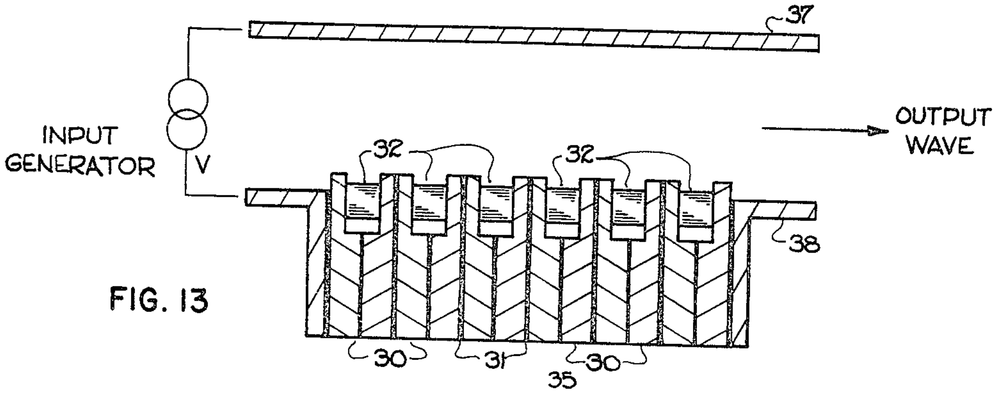
Figure 14:
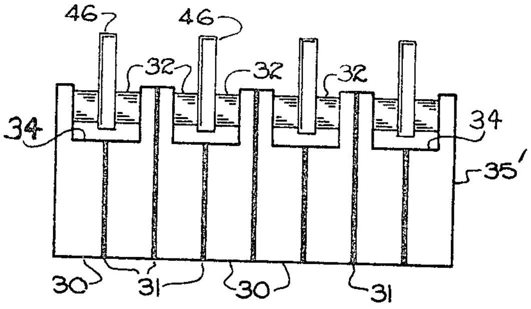
Figure 15:
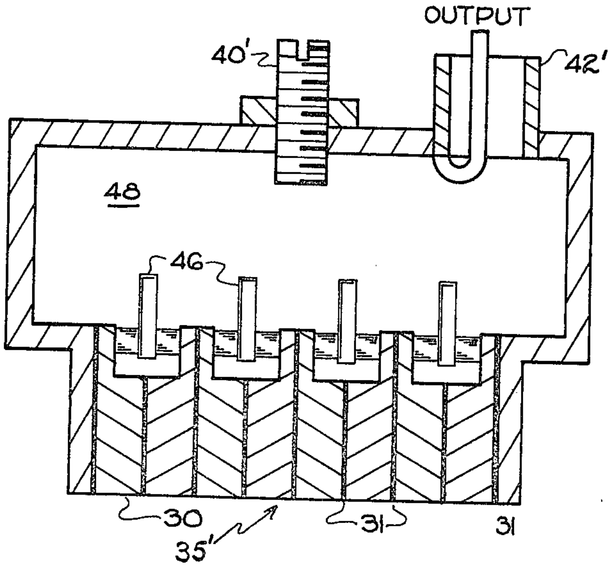
Figure 16:
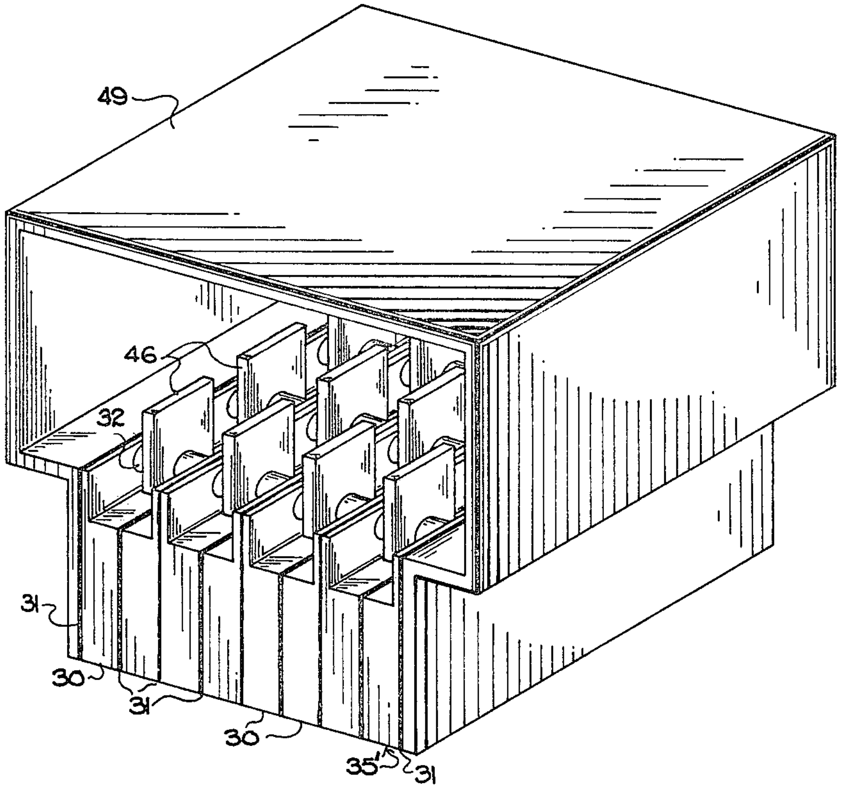
Figure 17:
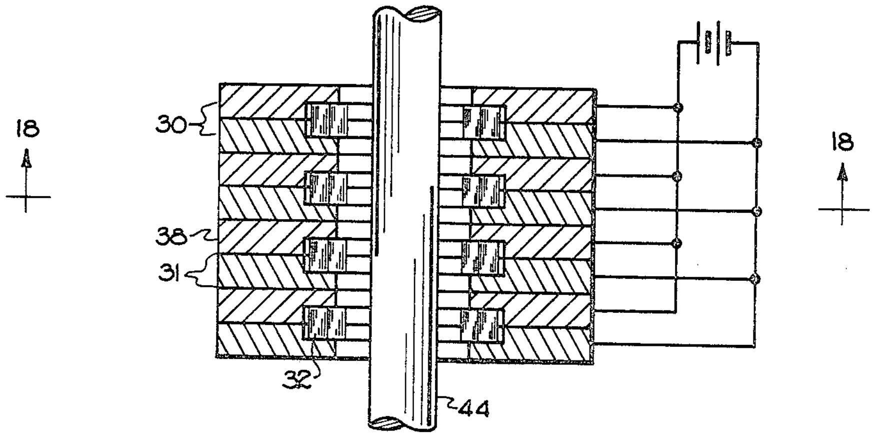
Figure 18:
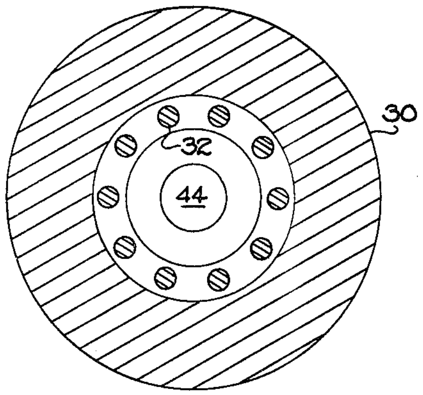

FIG. 3 graphically represents an example of the undesired frequencies at the higher end of the spectrum relative to the desired frequencies;

FIG. 4 illustrates another equivalent circuit in accordance with the invention;

FIG. 5 illustrates a variation of the embodiment of FIGURE 4;

FIG. 6 graphically represents an example of undesired frequencies at the lower end of the spectrum relative to the desired frequencies;

FIG. 7 illustrates the equivalent circuit of another embodiment in accordance with the invention wherein coupling is obtained inductively to a transmission line or waveguide;

FIG. 8 illustrates a variation of the embodiment of FIG. 7;

FIG. 9 schematically illustrates a multiplicity of electron discharge elements mounted in a laminated block structure;

FIG. 10 schematically illustrates the embodiment of FIG. 9 mounted in a wall of a section of rectangular waveguide;

FIG. 11 schematically illustrates a cavity resonator of cylindrical shape with its inner wall formed as a cylindrical stack of laminae using construction similar to FIG. 9;

FIG. 12 is a cross-section on line 12—12 of FIG. 11;

FIG. 13 schematically illustrates the embodiment of FIGURE 9 in combination with a transmission line;

FIG. 14 schematically illustrates a microwave embodiment of the diode mounting circuits shown in FIGURE 5;

FIG. 15 is a vertical section showing the embodiment of FIG. 14 in the bottom wall of a cylindrical cavity;

FIG. 16 is an isometric view of a microwave embodiment of the circuit of FIGURE 8; and FIGS. 17 and 18 illustrate the invention according to FIGURE 9 as applied to a coaxial transmission line.

Figure 2:
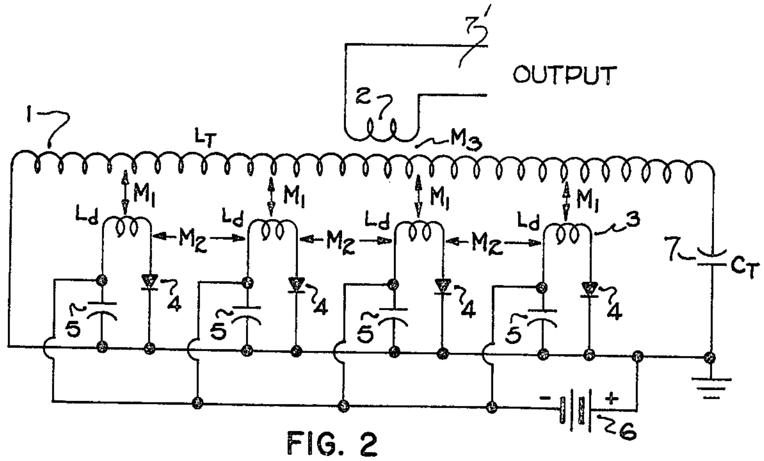
FIG. 2 illustrates an equivalent circuit of one class of network in accordance with this invention.

FIGURE 2 shows an equivalent circuit of one class of network designed according to this invention, shown here in lumped-element circuit form for purposes of explanation. A microwave structure embodiment of this network is shown in FIGS. 11 and 12. The electron discharge elements (hereinafter sometimes called "active elements") are shown in FIGURE 2 as semiconductor diodes 4. These are biased through inductors 3 ($L_d$), by-passed to ground through capacitors 5, in parallel by a bias battery 6 connected across the by-pass capacitors. The inductances $L_d$ represent the inductance of the biasing and mounting means of each diode 4.

A large inductor 1, of value $L_T$ is in a primary resonator subcircuit which is resonated in a band including the desired frequency $f_o$ by the series capacitor 7 ($C_T$). The resonance frequency may be calculated by the formula $$f_o=\frac{1}{2\pi\sqrt{L_TC_T}}$$

Each of the smaller inductors has a mutual inductance $M_1$ with the larger inductor 1. A small mutual inductance $M_2$ may also be present between adjacent smaller inductor 3.

An output line 7 is coupled through output inductor 2 and mutual inductance $M_3$ to the primary resonator $L_T$, $C_T$. The diodes 4 each have a capacitance $C_d$ and there will be a resonant frequency $f_s$ computed by the formula $$f_s=\frac{1}{2\pi\sqrt{L_dC_d}}$$

This is the natural resonant frequency of the diode in its bias and mounting means.

A complex network of this kind containing a large number of resonant loops coupled together will normally have as many resonant or "normal" modes as there are resonant loops. Because of interaction among the loops, however, these normal modes are at somewhat different frequencies than would be found in the individual loops if they were not coupled together. Any one such mode will normally involve circulating currents flowing in all of the loops simultaneously. The various distinct modes may be distinguished by different frequencies and by different phase difference relationships of the currents among the various loops.

For purposes of illustration and without intending to limit the scope of the invention it is assumed that four diodes are used in four small loops as shown in FIG. 2. (Numbers of diodes much larger that four may be utilized; hundreds or even thousands of electron discharge elements are contemplated.) Suppose that the outer (primary resonator) loop containing inductor 1 and capacitor 7 has a resonant frequency $f_o$ and that the individual diode loops each have a nominal or "natural" resonant frequency $f_s$ which is higher, perhaps on the order of $2f_o$. A complete analysis of such a network will show resonant modes at frequencies approximately as shown in FIG. 3. This shows the line spectrum of such modes. The mode near $f_0$ will be perturbed to a slightly lower frequency $f'_o$. In addition there will be four modes in the band of frequencies near $f_s$, in general falling between the limits $$\frac{f_s}{\sqrt{1+\left(\frac{2M_2}{L_d}\right)}} \leq f_m \leq \frac{f_s}{\sqrt{1-\left(\frac{2M_2}{L_d}\right)}}$$

In general, the mutual inductance $M_2$ will be much smaller than the self-inductances $L_d$ so that the band containing the four upper modes will lie in a narrow range about $f_s$. The lower-frequency mode $f'_o$ near $f_o$ is the desired frequency mode. According to the principles set forth in this invention the negative conductance properties of the diodes 4 should be substantially ineffective at frequencies near $f_s$ so that oscilliationss are not possible in these modes. However, if the diodes have a substantially negative resistance effect in the band of lower frequencies including $f_o$, frequencies in this band (including $f'_o$) can be coupled into the primary resonator loop of inductor 1 so that the network may oscillate or amplify using this low frequency mode only. It is significant that all of the diodes can be coupled equally into this mode so that each can provide an equal share to the total power output of the network in the lower frequency band.

This principle of mode separation is a major feature of the invention. The network just described accomplishes the desired aim of combining many negative-resistance elements into a single network with a single output, combining the power capabilities of all of the elements. The network also avoids the hazards of oscillation in undesired resonant modes of the network. This has been accomplished through a novel network in which all modes but the one desired are in a band of frequencies where the active elements are substantially ineffective as negative-resistances or power generators.

Figure 1:
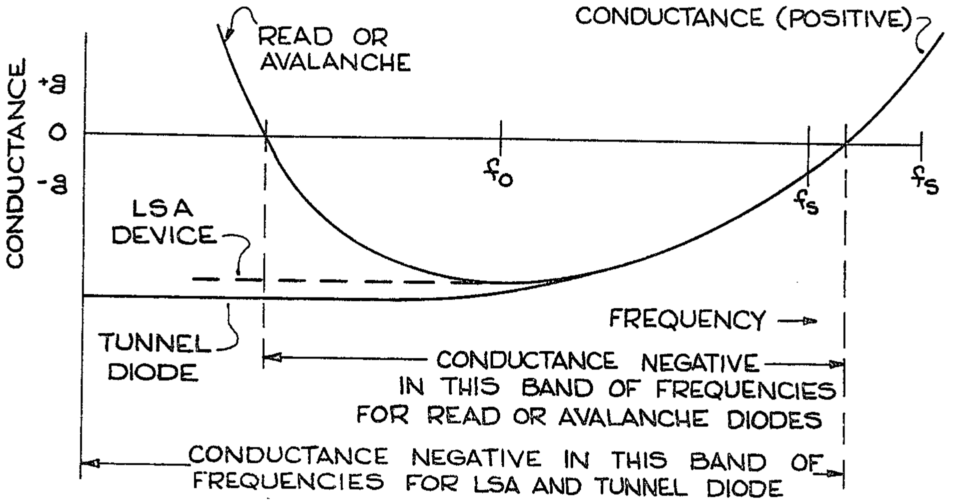
FIG. 1 shows the above-referenced graph of conductance variation vs. frequency.

FIGURE 4 illustrates an alternative circuit arrangement which can provide an equivalent degree of mode separation. In this network, the primary resonator including inductor 11 ($L_T$) and capacitor 10 ($C_T$) is resonant at or near the desired frequency $f_o$. An output line 9 is inductively coupled to the inductor 11. Again, a multiplicity of active electron discharge elements, here represented as diodes 15, are coupled, capacitively through a multiplicity of small capacitors 12 ($C_C$), instead of inductively as in FIGURE 2. The many loops containing the diodes are intended to be similar to one another and to be resonant at or near a frequency where the active elements 15 are substantially ineffective as power generators or negative resistance elements. By-pass capacitors 14 complete each loop for A.C., and bias voltage from a battery 16 is applied across each of these capacitors. In this class of network, it may be more appropriate if each of the local diode resonant loops has a natural resonant frequency lower than $f_o$. Such a circuit is suitable for the Read or avalanche diode element, which is not effective as a negative conductance at the lowest frequencies (see FIG. 1). The mode spectrum for such a circuit is illustrated in FIG. 6. The resistors 18 shown in each local diode loop may be intentionally inserted, or they may represent the inherent lossiness of the inductors 13. Such resistors may be of additional help in suppressing undesired modes of resonance.

FIGURE 5 shows another method of coupling negative-resistance elements into the circuit of FIG. 4. As in FIG. 4, many such diodes (now in pairs 15, 15) may be coupled into a single primary resonator $L_TC_T$. In this case, two diodes biased in series through a small inductor a small inductor 19 are shown. This inductor will desirably have a very small value of inductance $L_d$ and in the limit may represent only the unavoidable inductance of a direct electrical connection (i.e.: the diode mounting and biasing means). In this case, the local diode loop resonant frequency is that of the two diode capacitances in series with the inductor 10. This will be most suitable for local resonant frequencies $f_s$ much higher than the desired frequency $f_o$, giving a spectrum as shown in FIG. 3. The coupling current path from the common terminal 17 through any coupling capacitor 12 divides between the two diodes which are connected each in series with that capacitor.

The basic circuits of FIGS. 2, 4 and 5 are suitable as described for use as high frequency oscillators. Such circuits can also be used as negative-resistance amplifiers, by techniques now well known in the field. To do so, a signal generated elsewhere may be injected through a ferrite circulator (not shown) into the output line 7 (FIG. 2) or 9 (FIG. 4). This signal wave can be caused to be reflected from the network along the line with a power greater than that applied. This amplified reflected wave can be separated externally in a known manner by the use of the ferrite circulator. If the mutual coupling inductance ($M_3$ in FIGURES 2 and 4) is made sufficiently large, self oscillation of such a network can usually be prevented, and amplification will, nevertheless, be obtainable.

In accordance with known principles, oscillators of the types herein described may be "injection locked" by a technique similar to that described above for amplification. Such oscillations may be caused to assume the identical frequency of an injected signal wave, giving an output power greater than the power injected.

It may be noted that the circuits of FIGURES 2, 4 and 5 might also include two or more diodes in series where only one is shown in each local diode loop. Similarly each electron discharge element in each of these circuits might consist of two or more small diodes in shunt in place of the one shown.

Another set of alternative arrangements of the invention involves coupling a multiplicity of active elements, using same principles, into waveguides or transmission lines instead of into resonators. FIG. 7 shows an example of an inductively coupled approach for multiple diodes in a transmission line or waveguide. Such a transmission line or waveguide may be represented schematically as having distributed inductance $L_L$ per unit length along the path 22 and distributed capacitance shown as many shunt capacitors 29 ($C_L$). Each small loop contains an inductor 20 ($L_d$) and an active (e.g. diode) element 21 with capacitance $C_d$ resonant at some frequency substantially different from the desired operating frequency where the negative conductance of the element is largely ineffective. A by-pass capacitor 28 completes each loop, and bias voltage is applied to the active elements in parallel. A mutual inductance $M_1$ exists between each small diode loop and the distributed inductance 22 ($L_L$) of the transmission medium. A small mutual inductance $M_2$ may also exist between adjacent small diode loops. As in the resonator case, a number of resonant modes or transmission modes involving the mutually coupled small loops will be present. Again, the frequency range for these will lie in a narrow band of frequencies as indicated by the relation $$\frac{f_s}{\sqrt{1+\left(\frac{2M_2}{L_d}\right)}} \leq f_m \leq \frac{f_s}{\sqrt{1-\left(\frac{2M_2}{L_d}\right)}}$$

where $f_s$ is the nominal resonant frequency of each small loop if it were uncoupled. As before, substantially no oscillations will occur in such modes if the negative conductance of the electron discharge elements 21 is substantially ineffective in this band of frequencies.

However, at all frequencies, a wave traveling on the transmission line 22 will be coupled to each diode loop through mutual inductances $M_1$ and, in the band of frequencies where negative conductance effects occur, it will be found that this coupling will add power to a traveling wave on the line in exactly the converse way in which positive resistance in such loops would cause a loss of power from the traveling wave.

FIGURE 8 shows a similar type of transmission line in which the multiple active elements 26 are coupled to the transmission line through small capacitors 25 ($C_C$) instead of through mutual inductance. Here the series diode pair arrangement of FIG. 5 is shown but the local circuit arrangement near the diodes as shown in FIG. 4 is equally applicable. The principle is similar to that in FIG. 7. Again, spurious modes can be eliminated by the same principles of frequency separation and power will be added to a traveling electro-magnetic wave as it passes through the line 22.

In the two alternative arrangements, shown in FIG. 7 and FIG. 8 very large numbers of diodes can be used. If the coupling mutual inductances or capacitances are small, then a very high power wave may propagate on the line, yet each diode element will be excited by a voltage or current from the wave which can be predetermined at a value for optimum power transfer from the diode to the line without exceeding its voltage or current capability. This value is determined by the value of the coupling mutual inductance $M_1$ or coupling capacitance $C_C$, and other parameters of the network.

The discussion up to this point has been concerned with schematic diagrams using lumped-element networks of the kind which are common for radio frequencies up to the lower parts of the U.H.F. bands. These have been useful in explaining the behavior of these new circuits. However, many applications of this invention are at much higher frequencies, extending from the UHF bands through the microwave bands up to 10,000 mHz. and beyond. In devices for such frequencies, distributed-constants types of networks are commonly used. Equivalence between lumped element and distributed element networks is a common feature of microwave technology such that distributed networks are often described in terms of approximate lumped-element equivalent circuits. Some distributed network element configurations of these devices will now be shown which more closely resemble, in a physical sense, the networks used in practice in the microwave region.

Referring to FIG. 9, a laminated block structure is shown consisting of several layers of metal 30 with thin layers of dielectric 31 separating and insulating them one from another. Step cut-outs 34 are formed in each metal layer confronting each other in pairs as shown with a row of active solid-state elements 32 in each of the resulting slots between adjacent layers 30.1 and 30.2; the elements may be semi-conductor diodes soldered or bonded in place via their respective electrodes. A bias source 33 applies bias voltage between the alternate and intervening metal layers 30.1 and 30.2 to activate the active devices, which might be Read avalanche diodes, Gunn diodes, tunnel diodes, or any other type of active negative-resistance element. Such a block structure including elements and layers of metal and dielectric can include a large number of active elements. Twenty-five are shown in this figure for illustration, but much larger numbers are possible. To radiate away excess heat, the alternate layers 30.1 may extend beyond the intervening layers 30.2 at the lower end of FIG. 9, for example.

A block 35 of this sort includes by-pass capacitance in the dielectric spacing layers 31 corresponding to the capacitors 5 in FIG. 2 and 28 in FIG. 7. There will be a local inductance associated with each active device in a current path including the element itself and the metal surface down the sides and across the bottom of the slot in which the element is installed. This corresponds to the inductors 3 ($L_d$) in FIGURE 2 or inductors 20 ($L_d$) in FIGURE 7.

Such a block 35 can be used as an integral portion of a resonant cavity or a microwave transmission line, being placed for example so that high frequency currents of the cavity or waveguide will flow across the slotted surface of the block in a direction perpendicular to the slots. Associated with such current flow there will be a magnetic field in the slots. The inductance associated with this magnetic field occupies some of the same volume as that due to circulating currents through each electron discharge element 32, thus forming a mutual inductance between the element loops and the waveguide or cavity in which the block is installed. An alternative method of mounting the diodes is to have one electrode of each semiconductor 32 spaced from the metal layer 30.1 or 30.2, and fitted with a conductor (not shown) connected at one end to said metal layer in the vicinity of the bottom of the channel, such conductors extending at the other end out of the channel, and being connected at an intermediate point to said one electrode.

FIG. 10 shows a block 35 of this type presenting its slotted surface as one wall of a section of waveguide line 36. This principle may be extended by placing such blocks on one or both sides repeatedly or continuously along the axial length of the waveguide for an extended distance. An input wave can be introduced at one end and an output wave taken from the other end of the line 36.

FIG. 11 shows a cavity resonator 41 of cylindrical shape with its cylindrical wall 38 formed as a cylindrical stack using construction similar to the rectangular stack of FIG. 9. Here, the active face of the cylindrical stack is the inner slotted cylindrical surface, with the active electron discharge elements 32 arranged in annular slots around the inner circumference. This corresponds quite closely to, and forms a microwave embodiment of, the circuit of FIG. 2, using forty elements instead of four. Here a tuning screw 40 is shown in the cavity 41. This cavity 41 is the equivalent of the resonator $L_TC_T$ of FIGURE 2, with the tuning screw 40 providing the adjustment of capacitor 7 ($C_T$). FIG. 12 illustrates the placement of the active elements 32 with respect to the cavity 41. Output can be taken via the output terminal 42.

FIG. 13 shows how a block 35 containing many elements 32 according to FIG. 9 may be used as another wall of a waveguide or transmission line, here on one of the wide faces 38 where surface current flow is substantially parallel to the direction of power flow. The upper and lower conductors 37, 38 shown in FIG. 13 may also be the separate conductors of a "slab" or other type transmission line.

FIG. 14 shows a microwave embodiment of a portion of the circuit of FIG. 5, illustrating the active elements and their biasing and mounting means. The block 35' is similar in construction to that of FIG. 9, except that two elements are placed in series in each slot formed by the cut-outs 34. A small metallic probe, "flag" or antenna 46 is attached at the mid-point between each pair of diodes 32, 32 extending a short distance above the slotted surface, as shown. These probes will be sufficient to provide the capacitance $C_C$, corresponding to capacitors 12 of FIG. 5 or 25 in FIG. 8.

FIG. 15 shows a section of a cylindrical cavity 48 with such a block 35′ installed in the bottom wall. The probes 46 couple lightly, in a capacitive sense, to the resonator. The tuning screw 40′ is similar to the screw 40 in FIG. 11, and the output terminal 42′ is like 42 in FIG. 11.

FIG. 16 shows a similar block 35′ in a wide wall of a rectangular waveguide 49, presenting its slotted surface to the interior to provide a microwave embodiment of the circuit of FIGURE 8. Here the probes 46 extend a short distance toward the opposite wall of the waveguide 49 and form small capacitive coupling to a traveling wave propagating in the waveguide.

The transmission line amplifier circuits of FIGS. 7, 8, 13, 16 may have a serious drawback, as illustrated, in that amplification will occur for waves traveling in either direction along the line. If high gain is attempted in an unbroken length of line, oscillations can occur unless the lines are accurately matched in impedance to the load and source. Reflected waves can make multiple transits, with gain in both directions, causing oscillations. To avoid such oscillations, ferrite materials may be inserted into the lines using the types of ferrite which give greater power absorption for one direction of propagation than for the other. Many such techniques are well known in the art. An alternative approach is to use numerous short sections of transmission line, each with relatively low amplification. Ferrite isolators can then be inserted between sections to perform the same function. Many types of isolators are now well known in the art, and none is illustrated here.

FIGS. 17 and 18 show a coaxial line having an inner conductor 44, and an outer cylindrical conductor incorporating a cylindrical stack 38 similar to that of FIGS. 11 and 12 in its outer wall.

The embodiments of the invention which has been illustrated and described herein are but a few illustrations of the invention. Other alternative circuit arrangements may be made within the scope of this invention by those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention.

I claim:

1. A high frequency electrical network for operation in a given band of electric wave frequencies, comprising a multiplicity of electron discharge elements which when suitably biased exhibit negative resistance in said band, biasing means and mounting means for each of said elements having inductance of magnitude such that the range of natural resonant frequencies of each of said elements in said means is substantially different from said given operating frequency band and translating means coupled to said elements for extracting high frequency energy in said band from said elements.

2. A network according to claim 1 in which said translating means is a subcircuit having means to resonate said subcircuit at a frequency in said operating frequency band, and including means for reactively coupling each of said elements to said subcircuit.

3. A network according to claim 1 in which each of said elements is a semiconductor diode.

4. A network according to claim 3 in which each of said diodes has a capacitance, and said inductance of its biasing and mounting means has a magnitude which resonates said capacitance at a frequency in said range of natural resonant frequencies.

5. A network according to claim 1 in which each of said elements exhibits in said range of natural resonant frequencies conductance which is either positive or if negative is substantially smaller in magnitude than the negative conductance exhibited in said given band of operating frequencies.

6. A network according to caim 2 in which said subcircuit comprises inductance and capacitance means and said elements are each inductively coupled to said inductance means.

7. A network according to claim 2 in which said subcircuit comprises inductance and capacitance means, and including capacitive means coupled in series with each of said elements across said subcircuit.

8. A network according to claim 3 in which each diode is connected in a circuit loop in series with said inductance of its biasing and mounting means and a D.C.-isolating capacitor, and said biasing means comprises conductor means arranged to apply bias voltage across said isolating capacitor.

9. A high frequency electrical network for operation in a given band of electric wave frequencies comprising a multiplicity of electron discharge elements which when suitably biased exhibit negative resistance in said band, biasing means and mounting means for each of said elements having inductance of magnitude such that the range of natural resonant frequencies of each of said elements in said means is substantially different from said given operating frequency band, said biasing and mounting means comprising first and second electrically conductive layers having a dielectric layer between them and respective members extending beyond said dielectric layer separated from each other to form a channel having a bottom and two side walls, and an open side opposite the bottom, and mounted in said channel between said members a plurality of said discharge elements, each of said elements having two electrodes at least one of which is in direct electrical contact with one of said members, said means to apply bias being connected between said conductive layers, the capacitance of said conductive layers and intervening dielectric layer and the inductance of the mounting means for said discharge elements including said side and bottom walls of said channel serving to establish said range of natural frequencies, and translating means coupled to said elements for extracting high frequency energy in said band from said elements.

10. A network comprising a plurality of subassemblies each according to claim 9 in a layered configuration having the first conductive layer of each subassembly confronting but dielectrically separated from the second conductive layer of the next subassembly, the channels of all the subassemblies being parallel to each other with their open sides confronting a common plane, said means to apply bias being connected at one side to all of the first conductive layers in parallel and at another side to all of the second conductive layers in parallel.

11. A network according to claim 9 in which said translating means comprises field-confining means bounding a space for microwave electromagnetic wave energy, said field-confining means comprised of an envelope of electrically-conductive material, said envelope having an aperture, said members being effectively in said aperture with said open side of said channel confronting said space.

12. A network according to claim 11 in which said envelope comprises a cavity resonator.

13. A network according to claim 11 in which said envelope comprises a section of waveguide.

14. A network according to claim 9 in which said translating means comprises a section of transmission line, said members being effectively coupled to said transmission line.

15. A network according to claim 11 including means to extract microwave energy from said space.

16. A network according to claim 11 including means to introduce microwave energy into said space and means to extract microwave energy from said space.

17. A network according to claim 11 in which said space is cylindrical and said channel is annular with its open side substantially concentric with the axis of said space.

18. A network according to claim 11 in which said field-confining means in in the shape of a rectangular waveguide, and said channel is in a side wall thereof extending in the direction of the longitudinal axis thereof.

19. A network according to claim 11 in which said field-confining means in in the shape of a rectangular waveguide, and said channel is in a side wall thereof extending in a direction transverse to the longitudinal axis thereof.

20. A network according to claim 9 comprising at least one pair of said elements arranged in series between said members, one electrode of one of said pair being in direct electrical contact with one of said members, one electrode of the second of said pair being in direct electrical contact with the other of said members, the remaining electrodes of said pair being electrically conductively connected together.

21. A network according to claim 20 including an electrical conductor connected to said remaining electrodes and extending through said open side beyond said channel.

22. A network according to claim 21 including field-confining means bounding a space for microwave electromagnetic wave energy, said field-confining means comprised of an envelope of electrically-conductive material having at least one aperture, said members being effectively in said aperture with said open side of said channel confronting said space and said conductor extending into said space.

23. A network according to claim 22 in which said field-confining means is in the configuration of a rectangular waveguide and said channel is substantially in the locus of a wide wall thereof with said conductor extending parallel to the electric vector of the dominant mode of electro-magnetic wave propagation in said waveguide.

24. A network according to claim 22 in which said field-confining means is in the configuration of a cylindrical cavity and said channel is substantially in the locus of an end wall thereof with said conductor extending substantially parallel to the cylinder-axis of said cavity.

25. A network according to claim 9 in which the second electrode of said discharge elements is spaced from the other of said members, and including an electrical conductor connected to the other of said members in the vicinity of said bottom of said channel and extending out of said channel, said conductor being connected at an intermediate point to said second electrode.

26. Method of operating a network according to claim 1 comprising the steps of biasing said discharge elements to exhibit said negative resistance in said band, and driving said network with an alternating signal of such a magnitude that the time-average value of negative conductance of said elements substantially vanishes.

27. Method according to claim 26 in which said magnitude is such that said time-average conductance is positive in value.

28. A high frequency electrical network for operation in a given band of electric wave frequencies, comprising at least one discharge element which when suitably biased exhibits negative resistance in said band, biasing means and mounting means for said element having inductance of magnitude such that the range of natural resonant frequencies of said element in said means is substantially different from said given operating frequency band and translating means coupled to said element for extracting high frequency energy in said band from said element.

References Cited

UNITED STATES PATENTS

| | | | |
|---|---|---|---|
| 3,160,826 | 12/1964 | Marcatili. | |
| 3,189,843 | 6/1965 | Bruck. | |
| 3,254,309 | 5/1966 | Miller. | |
| 3,356,866 | 12/1967 | Misawa | 331—107 X |

ROY LAKE, Primary Examiner

S. H. GRIMM, Assistant Examiner

U.S. Cl. X.R.

330—34, 56; 331—107, 132; 333—80